H. HOLT.

Hand-Stamps.

No. 5,555. Reissued August 26, 1873.

Witnesses:

M. Gardner.

E. H. Graham.

Inventor.

Horace Holt.

Per Van Santvoord & Hauff.

Attys.

AM. PHOTO-LITHOGRAPHIC CO. N.Y. (OSBORNE'S PROCESS)

UNITED STATES PATENT OFFICE.

HORACE HOLT, OF BROOKLYN, NEW YORK, ASSIGNOR, BY MESNE ASSIGNMENTS, TO SECOMBE MANUFACTURING COMPANY, OF NEW YORK CITY.

IMPROVEMENT IN HAND-STAMPS.

Specification forming part of Letters Patent No. 38,864, dated June 9, 1863; reissue No. 5,555, dated August 26, 1873; application filed December 19, 1872.

*To all whom it may concern:*

Be it known that I, HORACE HOLT, of the city of Brooklyn, in the county of Kings and State of New York, have invented a new and useful Improvement in Hand-Stamps; and I do hereby declare the following to be a full, clear, and exact description thereof, which will enable those skilled in the art to make and use the same, reference being had to the accompanying drawing forming part of this specification, in which drawing—

Figure 1:
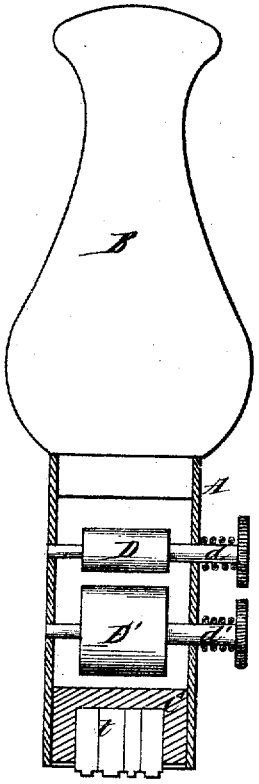
Figure 2:
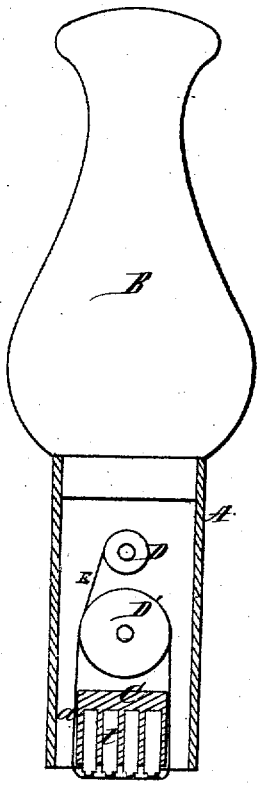
Figure 3:
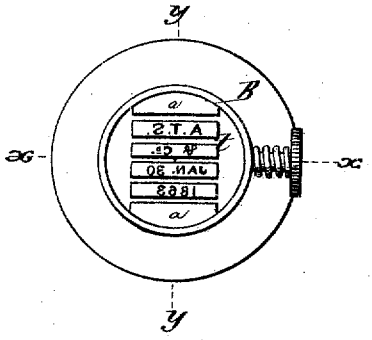

Figure 1 represents a sectional elevation of my improved stamp, the section being taken in the plane *x x*, Fig. 3. Fig. 2 is a sectional elevation of the same, the section being taken in the plane *y y*, Fig. 3. Fig. 3 is a face view of the same.

Similar letters indicate corresponding parts.

This invention consists in a hand-stamp, in which the two reels to which the ends of the inking-ribbon are fastened, and the die or chase, are placed between the handle of the stamp and the article to receive the impression in such a manner that a stamp is obtained which is cheap, compact, and convenient in its operation.

In the drawing, the letter A designates a cylinder made of metal or other suitable material and preferably hollow. This cylinder is provided at one end with a handle, B, of wood or other suitable material, and at the other end with a type box or chase, C, which may be let into the cylinder A flush, or nearly so, with the outer end thereof. The chase C, which may be made of composition or metal of any kind, is provided with a cavity or cavities to receive the type *t*. In case the chase C is let into the cylinder A, segments *a a* are taken off from its circumference on opposite sides to allow the inking-ribbon to pass between it and the cylinder. D D are rollers or reels, on which the inking-ribbon is wound. These rollers are secured on or in the cylinder A between the chase C and the handle B, and they are supported in a position parallel to each other by their journals. If the cylinder A is hollow, and the reels are secured in the interior thereof, their journals rest in holes made in opposite sides of said cylinder. On the end of one of the journals of each reel is secured a milled head or thumb-piece for turning the reels to shift the inking-ribbon upon the face of the type. The inking-ribbon E is shown in the drawing wound mostly on the reel D′ and passing from it down on the side of the chase across the face of the type, thence up on the opposite side of the chase to the reel D. On the shafts or journals of the reels D D′ are wound springs *d d′*, which bear at one end against the milled heads of said journals, and at the other against the cylinder A. These springs serve to prevent the reels from turning too freely, and to give the proper tension to the inking-ribbon.

If the handle B is grasped with one hand an impression can be produced upon any article which is to be marked, canceled, or dated, either by a strong pressure of the type upon the article, or by resting the type upon the article and striking upon the top of the handle with the hand or with a mallet. The inking-ribbon, being saturated with ink, imparts color to the impression. When the impression becomes indistinct in consequence of the printing or transferring properties being abstracted from the ribbon, the reel D is turned so as to draw the ribbon from the reel D′ and to present a fresh surface to the face of the type.

What I claim as new, and desire to secure by Letters Patent, is—

A cylinder, A, having attached to it two reels, D D′, to which the ends of an inking-ribbon are secured, and provided at one end with type *t* and at the opposite end with a handle, B, all made to move together when an impression is taken, substantially as described.

HORACE HOLT.

Witnesses:
W. HAUFF,
E. F. KASTENHUBER.